Jan. 18, 1949. P. S. DICKEY ET AL 2,459,689
FLUID RATE OF FLOW MEASURING APPARATUS
Filed Sept. 22, 1944 2 Sheets-Sheet 1

Inventors
PAUL S. DICKEY
AND JACK F. SHANNON
By Raymond D. Jenkins
Their Attorney Jan. 18, 1949.    P. S. DICKEY ET AL    2,459,689
FLUID RATE OF FLOW MEASURING APPARATUS
Filed Sept. 22, 1944    2 Sheets-Sheet 2

Inventors
PAUL S. DICKEY
AND JACK F. SHANNON
By Raymond D. Junkins
Their Attorney

UNITED STATES PATENT OFFICE 2,459,689

FLUID RATE OF FLOW MEASURING APPARATUS

Paul S. Dickey, East Cleveland, and Jack F. Shannon, Euclid, Ohio, assignors to Bailey Meter Company, a corporation of Delaware Application September 22, 1944, Serial No. 555,258

4 Claims. (Cl. 73—208)

Our invention relates to fluid flow meters, and particularly to a flow meter of the type to be inserted directly in the path of the flowing fluid and adapted to transmit or telemeter to a remotely located receiver which may record or indicate the rate of flow.

While the flow meter of our invention may be used in the measurement of substantially any flowing fluid, it is of particular advantage in the direct line measurement of fuel oil and like fluids. In the past it has been difficult to continuously measure the rate of flow of fuel oil to a furnace burner. With any type of meter located even a short distance away from the flowing line it has been necessary to heat lag the connecting pipes and the flow meter body so that fuel oil, tar, or heavy fluids of similar nature which are to be measured would not solidify or become gummy and introduce frictional resistance to the moving parts of the meter such that it would not function. With our meter this objection is obviated, for the entire flow of fluid passes through the meter body and if it does not pass through the meter body then there is no flow. In other words, at any time that there is any flow through the line there is the same flow through the meter body with a corresponding positioning of the metering element.

Figure 1:
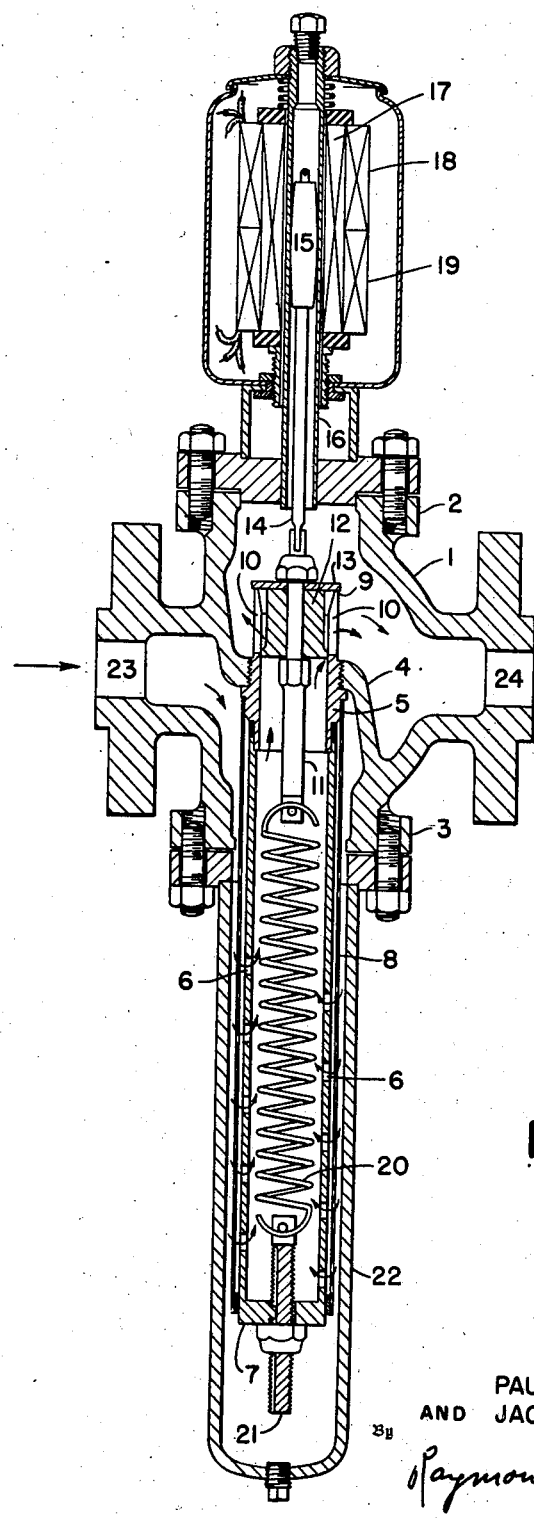
Fig. 1 is a sectional elevation through a flow meter embodying our invention.

Referring now in particular to Fig. 1, we show therein to approximately one-half scale a sectional elevation through a fluid flow meter adapted to be inserted directly in a one-inch pipe line supplying fuel oil to a burner for heating a furnace. The body member 1 is a standard one-inch valve body having a top mounting flange 2 and a bottom mounting flange 3 in alignment. Flow through the assembly is indicated by arrows.

Into the partition 4 of the valve housing 1 we thread a tubular member 5 having numerous openings 6 in its lower extension. The lower end is closed by a head 7, while the major portion of its length is surrounded by a fine mesh screen 8. The assembly extends a short distance above the partition 4 and at its uppermost end forms a seat as at 9 comprising a downward stop for the movable portion of the meter. Between the partition 4 and the seat 9 the cylinder 5 is provided with two vertical slots 10 having parallel sides and about .0104 inch wide. Obviously the number, width and shape of these slots may be varied as desired to take care of characteristics of the flowing fluid as well as desired maximum rate of flow or capacity.

The movable portion of the assembly includes a stem member 11, a plug 12 and a seating cap 13. The latter is adapted to rest upon the seat 9 under conditions of no flow. At such time the lowermost edge of the plug 12 just closes passage of fluid from within the cylinder 5 outwardly through the slots 10.

Positioned by the upper end of the stem 11 is a rod 14 carrying a magnetic core piece 15. Said core piece is positionable within a non-magnetic tube 16 relative to windings 17, 18 and 19.

To the lower end of stem 11 is fastened one end of a tension spring 20 whose other end is carried by an adjustable member 21. A fluid tight housing 22 is fastened to the flange 3 and surrounds the parts depending from the partition 4.

In the particular example being described the spring 20 is placed under an initial tension of approximately 10 p. s. i. with the cap 13 seating on the seat 9 and no fluid flow through the slots 10. Any pressure differential between the inlet 23 and the outlet 24 of less than 10 p. s. i. will not raise the plug 12 and cap 13 off from the seat 9, nor allow any fluid flow through the slots 10. If the differential across 23, 24 increases to 10 p. s. i. the movable system 11, 12, 13, 14 and 15 will attempt to move upwardly opposed by the spring 20. A definite relationship of position of the plug 12 relative to the slots 10 is obtained for every value of rate of flow and pressure differential across 23—24, and in the present example a maximum opening of the slots 10 (corresponding to maximum flow therethrough) occurs at approximately 11 p. s. i.

We have found that a plot of vertical movement relative to volume rate or weight rate of fluid flow through the slots 10 is substantially a straight line. If under any fluid conditions the deviation from a straight line is greater than the allowable metering error, then the slots 10 may be shaped to automatically correct the relationship to a linear relationship so that the positioning of the core 15 relative the windings 17, 18 and 19 will be directly with the rate of fluid flow.

We preferably make the clearance between the maximum diameter of the plug 12 and its mating internal diameter of the sleeve 5 .001 to .0005 inch. By this construction substantially no leakage is obtained at no flow position. The construction as a whole is extremely stable and frictionless due to the relatively long spring and spring supporting members as compared to the vertical length of the plug 12.

We design the number and width of the slots 10 to produce a desired maximum fluid flow therethrough with a total vertical uncovering of the slots of approximately one-half inch. It is appreciated that in the present example the two slots of a width of approximately .0104 inch and a total uncovering of about one-half inch in length does not give an area equal to the area opening of the inlet 23 or of the outlet 24. The relation between these areas is so designed as to obtain the initial and maximum pressure differential thereacross for actuation of the mechanism and to produce a desired maximum rate of fluid flow through the meter body at desired maximum pressure drop. Of course the pressure drops, both initial and final, are interrelated to the initial tension and scale of the spring.

Figure 2:
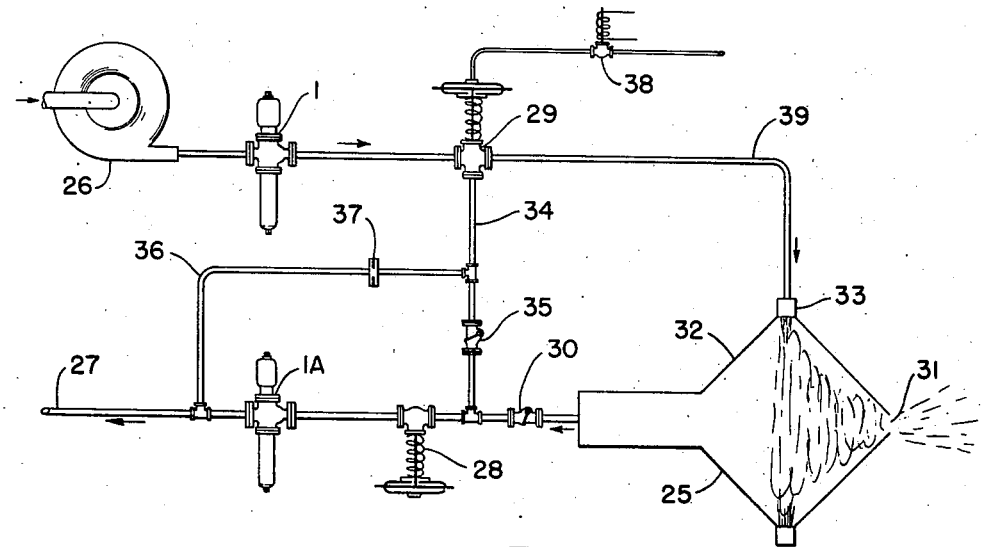
Fig. 2 is a piping diagram of an oil burner system including our meters.

In Fig. 2 we illustrate the incorporation of two flow meters of the types shown in Fig. 1 in a fuel oil burner system. The arrangement of Fig. 2 is not to scale. It is diagrammatic, and particularly the burner 25 is shown to greatly enlarged scale relative to the rest of the layout. This arrangement depicts a common recirculating system wherein a controllable percentage of the fuel oil pumped by a pump 26 is returned from the burner 25 through a pipe 27 under the control of a regulating valve 28.

In general, the fuel oil is forced by the pump 26 through the meter 1, a 3-way valve 29, the pipe 39, the burner 25, a check valve 30, the control valve 28 and the meter 1A to the return pipe 27. In its flow passage a controllable percentage of the fuel oil pumped is discharged from the burner 25 through an opening 31 to a furnace where it may be burned. Preferably the regulating valve 28 may be actuated by a combustion control system adjusting the discharge from the opening 31 to produce the heat desired. The burner 25, shown to greatly enlarged scale, is of a common type having a whirl chamber 32 to which the oil is supplied tangentially through a circumferential ring 33.

During normal operation the 3-way valve 29 is opened between the meter 1 and the burner 25 and closed to the by-pass pipe 34.

As previously mentioned the regulating valve 28, controlling the return of oil from the burner 25 to the pipe 27, controls the magnitude of the fire beyond the burner tip 31 and is positioned, for example, in accordance with steam pressure of a vapor generator, or to provide a desired fuel-air ratio for the combustion. The 3-way valve 29 is actuated pneumatically through the agency of a solenoid valve 38 which may be energized by a regular ignition or flame failure control. In other words, the arrangement may be such that if the flame beyond the nozzle tip 31 is extinguished, either purposely or accidentally, then the ignition control circuit will actuate the solenoid valve 38 to position the 3-way valve 29, closing oil from the ring 33 and opening passage to the by-pass line 34.

Under the shutoff condition the arrangement is such that substantially the same total rate of flow of oil is passed through the meter 1 and through the pipe 34. The portion of the total which passes through the by-pass line 36 is equivalent to that portion normally discharged from the burner tip 31 due to the fact that the resistance 37 plus the resistance of the pipe 36 is equal to the resistance of the pipe 39. The remaining portion of the total passing through the meter 1 passes through a non-return valve 35, the regulating valve 28 and the meter 1A. The check valve 35 allows no passage of oil (upward on the drawing) under normal operating conditions, but does allow a portion of the by-passed oil through the pipe 34 to pass through the meter 1A under burner shutoff operating conditions. Thus although the same total rate of flow through the meter 1 is all passed through the pipe 27, it is split through the pipe 36 and meter 1A in substantially the same proportion as it was previously split through the pipe 39 and meter 1A under normal operating conditions. This insures that the meter 1A is registering approximately a normal consumption rate for the burner 25, even though the burner is inoperative. This is of particular advantage where the meters 1 and 1A are interconnected with a fuel-air ratio control of the valve 28, for in that event the opening of the valve 28 is maintained at approximately the same rate of flow passage with the burner 25 shut off as when it is operating. Thus the burner 25 may be brought back into service automatically by the ignition control circuit at substantially the same rate of combustion at which it was taken out of service, thus preventing puffs or other damaging conditions to which the furnace might be subjected.

Figure 3:
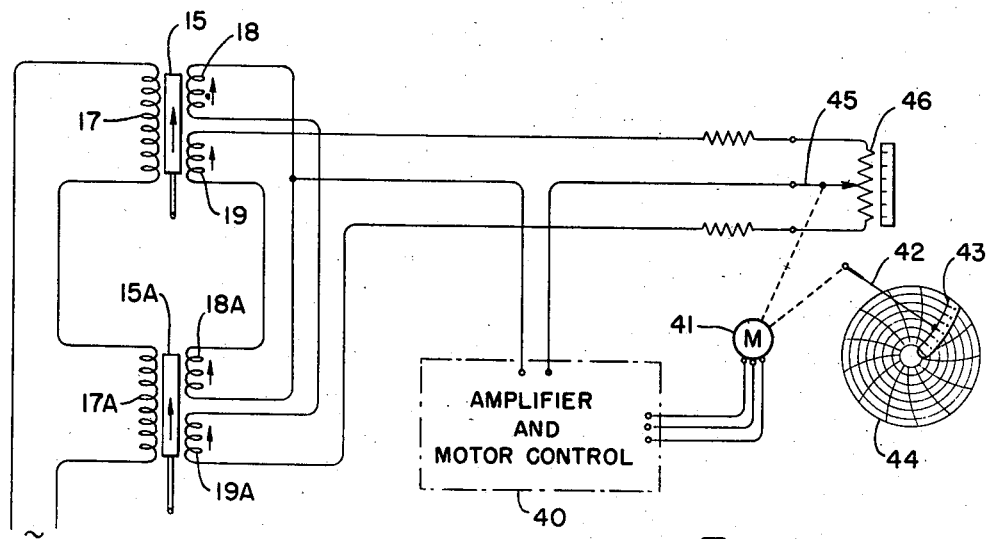
Fig. 3 is a wiring diagram in connection with Fig. 2.

In Fig. 3 we illustrate the wiring diagram of a preferred arrangement for interconnecting the total flow meter 1 and the return flow meter 1A to subtract their instantaneous measurement and produce a measurement (for recording or control purposes) equivalent to the actual rate of flow of oil through the burner tip 31 which of course is the difference between the total pumped through the meter 1 and the amount returned through the meter 1A.

Referring now to Fig. 3, it will be observed that the core piece 15 of the meter 1 and the core piece 15A of the meter 1A are diagrammatically shown adjacent their respective windings 17, 18, 19 and 17A, 18A and 19A. The general circuit of Fig. 3, adapted to subtracting the valves of meter 1A from meter 1 is disclosed and claimed in the patent to Hornfeck No. 2,406,221, dated August 20, 1946.

Positioning of the core piece 15 relative to the windings 17, 18 and 19 induces in the windings 18 and 19 values representative of the total rate of oil flow through the meter 1. Similarly, positioning of the core piece 15A relative to the windings 18A and 19A induces in the latter values representative of the rate of flow of return oil through the meter 1A. The circuit is so arranged that the values are subtractive to obtain a resultant representative of the difference between the total rate of flow through the meter 1 and the rate of return flow through the meter 1A and thereby a representation of the rate of supply of fuel through the burner tip 31.

In the circuit of Fig. 3 an amplifier and motor control 40 controls the motor 41 for positioning an indicating, recording pen 42 relative an index 43 and to record continuously on a time revoluble chart 44. Simultaneously the motor 41 positions a contact arm 45 along a balancing potentiometer resistance 46.

If the rate of fluid flow through the meter 1 and/or the meter 1A varies, then the position of the core piece 15 and/or 15A will be shifted relative to the related windings and the circuits will be unbalanced. Such unbalance results in an operation of the motor 41 in proper direction to record and indicate the deviation in difference between the rates through 1 and 1A. At the same time the contact 45 of the potentiometer 46 is moved by the motor 41 in proper direction and amount to rebalance the circuit and stop the motor 41.

In general we have provided an improved meter for measuring the rate of flow of a fluid under its in situ or existing conditions of temperature, pressure and the like. Such flow meter is adapted to transmit its measurement to a remote location, and furthermore to interrelate the measurement of a plurality of such fluid flows. We provide an improved metering arrangement in connection with a return oil burner supply system continuously subtracting the return oil from the total oil and thereby obtaining a continuous indication or record of the net rate of oil flow passing out of the burner tip.

What we claim as new, and desired to secure by Letters Patent of the United States, is:

1. A fluid flow meter comprising, in combination, a housing having axially aligned inlet and outlet openings and a separating partition therebetween, a ported member secured within an opening in said partition and having an elongated tubular portion extending from one side of said partition with its axis lying in a plane perpendicular to the axes of said inlet and outlet openings, said tubular portion having openings along its length for connecting its interior in communication with the housing portion receiving fluid from said inlet opening, a valve plug positionable relative to said ported member for controlling the flow of fluid therethrough, a tension spring secured at one end to said valve plug and adjustably connected at its other end to said tubular portion, said spring extending axially through said tubular portion and operating to urge said valve plug toward its closed position, and a rate of flow transmitter supported by said housing and having a winding energized from a source of A.-C., a plurality of windings inductively coupled to said first winding, and a magnetic core piece connected to said valve plug and movable relative to said windings for varying the inductive coupling in correspondence with changes in the rate of fluid flow.

2. A fluid flow meter comprising a housing structure having inlet and outlet openings and a separating partition therebetween, a ported member secured in said partition and providing a flow port through the housing structure, a valve plug positionable relative the ported member and normally closing off fluid flow through the port, an elongated tubular member extending from one side of said partition within the housing member, a tension spring secured at one end to the valve plug and at the other end to the tubular member, said tubular member enclosing the spring and being provided with a plurality of openings for exposing the adjacent end of the valve plug to fluid from the inlet opening of the housing structure, and a rate of flow transmitter connected to the valve plug and positionable therewith.

3. A fluid flow meter comprising a housing structure having aligned inlet and outlet openings and a separating partition therebetween, a ported seat member secured in said partition and providing a flow port through the housing structure, a valve plug positionable relative the ported seat member and normally closing off fluid flow through the port, an elongated tubular member extending approximately at a right angle to the axis of the aligned openings from one side of said partition within the housing member, a tension spring secured at one end to the valve plug and at the other end to the tubular member, said tubular member enclosing the spring and being provided with a plurality of openings for exposing the adjacent end of the valve plug to fluid from the inlet opening of the housing structure, stop means connected to the plug and arranged to abut said ported seat member when the valve plug is in closed position, and a rate of flow transmitter on the other end of the valve plug and positionable therewith.

4. A fluid flow meter comprising, in combination, a housing having inlet and outlet ports and a separating partition therebetween, a cylindrical member supported by said partition in a position with its longitudinal axis extending perpendicular to a plane including the axis of said inlet port and opening at one end into the housing space with which said outlet port communicates, slots formed in the walls of said cylindrical member adjacent said one end, a plunger having a portion reciprocable in said cylindrical member and another portion engageable with said one end of said cylindrical member, said plunger portion reciprocable in said cylindrical member extending just beyond the inner end of said slots when said other portion engages said one end of said cylindrical member, means for urging said plunger into engagement with said one end of said cylindrical member, ports in said cylindrical member at points spaced laterally from the axis of said inlet port for admitting fluid from the latter to said cylindrical member at the inner end of said plunger, and a rate of flow indicator operatively connected to said plunger.

PAUL S. DICKEY.
JACK F. SHANNON.

REFERENCES CITED

The following references are of record in the file of this patent:

UNITED STATES PATENTS

| Number | Name | Date |
| --- | --- | --- |
| 299,737 | Chapin | June 3, 1884 |
| 522,995 | Maxim | July 17, 1894 |
| 1,068,926 | Popoff | July 29, 1913 |
| 1,641,744 | Decker | Sept. 6, 1927 |
| 1,671,106 | Fisher | May 29, 1928 |
| 1,917,974 | Inglis et al. | July 11, 1933 |
| 2,052,022 | Fisher | Aug. 25, 1936 |
| 2,229,195 | Smith | Jan. 21, 1941 |
| 2,265,961 | Ziebolz | Dec. 9, 1941 |

FOREIGN PATENTS

| Number | Country | Date |
| --- | --- | --- |
| 266,679 | Germany | Oct. 29, 1913 |